US010075532B2

United States Patent
Schmidt et al.

(10) Patent No.: US 10,075,532 B2
(45) Date of Patent: *Sep. 11, 2018

(54) METHOD AND SYSTEM FOR CONTROLLING REMOTE SESSION ON COMPUTER SYSTEMS

(71) Applicants: Jens Schmidt, Osterholz-Scharmbeck (DE); Sascha Goeckel, Gross-Bieberau (DE); Jonathan Allsop, Chester (GB)

(72) Inventors: Jens Schmidt, Osterholz-Scharmbeck (DE); Sascha Goeckel, Gross-Bieberau (DE); Jonathan Allsop, Chester (GB)

( * ) Notice: Subject to any disclaimer, the term of this patent is extended or adjusted under 35 U.S.C. 154(b) by 77 days.

This patent is subject to a terminal disclaimer.

(21) Appl. No.: 14/993,512

(22) Filed: Jan. 12, 2016

(65) Prior Publication Data
US 2017/0201588 A1 Jul. 13, 2017

(51) Int. Cl.
*H04L 29/06* (2006.01)
*H04L 29/08* (2006.01)

(52) U.S. Cl.
CPC ........ *H04L 67/141* (2013.01); *H04L 63/0876* (2013.01); *H04L 63/102* (2013.01); *H04L 67/142* (2013.01); *H04L 67/40* (2013.01)

(58) Field of Classification Search
None
See application file for complete search history.

(56) References Cited

U.S. PATENT DOCUMENTS

| 7,289,964 | B1 * | 10/2007 | Bowman-Amuah | ......................... G06F 9/5038 705/1.1 |
| 8,316,237 | B1 * | 11/2012 | Felsher | ................. H04L 9/0825 380/282 |
| 9,613,190 | B2 * | 4/2017 | Ford | ....................... G06F 21/10 |

(Continued)

OTHER PUBLICATIONS

Shiraz, Muhammad; Gani, Abdullah; Khokhar, Rashid Hafeez; Buyya, Rajkumar. A Review on Distributed Application Processing Frameworks in Smart Cloud Mobile Devices for Mobile Cloud Computing. IEEE Communications Surveys&Tutorials. vol. 15, Issue: 3. Pub. Date: 2012. https://ieeexplore.ieee.org/stamp/stamp.jsp?tp=&arnumber=6365155.*

(Continued)

*Primary Examiner* — Jeremiah Avery
(74) *Attorney, Agent, or Firm* — Gerald E. Hespos; Michael J. Porco; Matthew T. Hespos (57) ABSTRACT

Method and devices are provided for controlling access of a device to a remote desktop or an application running on a remote desktop or application server using a remoting protocol. The method includes: registering the device with a device state server to store identifying information, including a push notification token; using the device state server with access to the device identifying information to wake a device state application on the device in response to detection of connectivity between the device and the remote desktop or application server; monitoring the device to determine a device state; sending the device state from the device to the device state server and then to the remote (Continued)

desktop or application server; and determining based on the received device state if an access to the remote desktop or remote application running in the user session is allowed, otherwise blocking the access.

20 Claims, 7 Drawing Sheets

(56) References Cited

U.S. PATENT DOCUMENTS

| | | | | |
|---|---|---|---|---|
| 2003/0058277 | A1* | 3/2003 | Bowman-Amuah | G06F 17/30607 715/765 |
| 2003/0229900 | A1* | 12/2003 | Reisman | G06F 17/30873 725/87 |
| 2007/0171921 | A1* | 7/2007 | Wookey | G06F 3/1415 370/401 |
| 2007/0192872 | A1* | 8/2007 | Rhoads | G06F 3/017 726/26 |
| 2010/0293106 | A1* | 11/2010 | Rhoads | G06Q 10/083 705/330 |
| 2014/0047560 | A1* | 2/2014 | Meyer | G06F 21/62 726/28 |
| 2015/0163206 | A1* | 6/2015 | McCarthy | G06F 21/6227 713/171 |
| 2016/0099963 | A1* | 4/2016 | Mahaffey | H04L 63/1433 726/25 |
| 2017/0041296 | A1* | 2/2017 | Ford | H04L 63/0421 |

OTHER PUBLICATIONS

Willems, Christian; Klingbeil, Thomas; Radvilavicius, Lukas; Cenys, Antanas; Meinel, Christoph. A Distributed Virtual Laboratory Architecture for Cybersecurity Training. 2011 International Conference for Internet Technology and Secured Transactions (ICITST). Pub. Date: 2011. https://ieeexplore.ieee.org/stamp/stamp.jsp?tp=&arnumber=6148474.*

* cited by examiner

METHOD AND SYSTEM FOR CONTROLLING REMOTE SESSION ON COMPUTER SYSTEMS

BACKGROUND

1. Field of the Invention

This invention is direct to a method and device to control user session as it connects to a remote desktop or application, using a device state server to facilitate the exchange of device state between the connecting device and the remote desktop or application server. Further, the invention continues to monitor the state of the device for as long as it connected to the remote desktop or application.

2. Description of the Related Art

In the following a general term definition is provided which is used within the application documents:

Device—A laptop, physical desktop, thin client, tablet, mobile phone used by a user such as an employee, contractor or supplier to connect to a remote desktop or remote application.

Thin Client—A corporate owned physical desktop dedicated to accessing a remote desktops or remote applications.

Connected Device—Same as device, although with emphasis on the fact that the device is connected to the remote desktop or application.

Connecting Device—Same as device, although while the device is actively establishing a connection with the remote desktop or application.

Device State—The state of the device, including the state of the physical device, the operating system that runs on it, and the logged in user session. The state can be defined by one or more of the following parameters: Anti-Virus enabled, Firewall enabled, Wi-Fi connectivity/security, Installed Applications, Running Applications, User Security, Group membership, User Privileges, Geographical Location, Geographical Elevation, and others.

Remote Desktop—A Windows (or other) desktop, running on a server within a corporate data center or on the internet (cloud), allowing user to launch one or more applications which run within a remote user session and is delivered via a remoting protocol to a device.

Remote Application—A single Windows (or other) application, offering a user interface that runs in a remote session and is delivered via a remoting protocol to a device. In comparison to the remote desktop only the relevant application data is transmitted and not the complete desktop, so that the application although running remote is integrated into the local desktop.

Access Token—An access token is an Operating System concept which describes the security context of an application, and determines the access that the operating system grants to the process. The access token consists of a set of security groups, privileges and claims which the operating system uses to control access to securable objects, such as files and folders and the Windows Registry. This Access Token is also used by the invention to control the access.

Remote Desktop or Application Server—A server, either physical or virtual, that is configured to allow remote access to either the desktop or one or more applications.

Remoting Protocol—A network protocol used to capture graphics, audio, clipboard or storage from a remote session and deliver it to a device where it can be reconstructed to give the illusion that the remote desktop or application is running on the local device.

Remoting Protocol Service—An application launched by the Operating System which implements the server side of the Remoting Protocol.

Gateway Server—A server which facilitates the connection between the Connecting Device and the Remote Desktop or Application Server. The gateway server may choose to allow or deny the connection based upon the configuration. It may also connect the network of the Connecting Device to the Remote Desktop or Application Server using technologies such as a Virtual Private Network (VPN).

Virtual Channel—Provided by the remoting protocol, the virtual channel allows third parties (or the remoting protocol vendor) to implement communicate between software running on the remoting client and software running on the remote desktop server.

Remoting Client—An application that runs on a device, implementing the client end of the remoting protocol and presents to the user either a remote desktop or remote application.

User Session—An abstract concept of an operating system to represent an authenticated and logged in user, their desktop, and the applications that they are running either on virtual desktop or virtual machine providing a virtual desktop.

Remote User Session—A user session running on a remote computer, and is delivered over the internet or intranet by communications using a remoting protocol. In contrast to that is the local session when the user is logged into the user session with the keyboard, mouse and monitor physically connected to the remote desktop or application server.

Windows Registry—A hierarchical database of settings for the Microsoft Windows Operating System and Microsoft Windows applications.

Environment Variables—A set of name/value pairs that can affect the way applications run. Environment Variables can be global, or specific to a user or user session.

Administrative Scripts—Written in one of many high level programming languages, Administrative Scripts are written by IT departments to manipulate the behavior of the Operating System to increase the user experience, or to enforce corporate policy.

Third Party Tools—Much like the Administrative Scripts, a number of third party tools exist written by the OS vendor or independent software vendors, allowing IT departments to manipulate the behavior of the Operating System to increase the user experience, or to enforce corporate policy.

Operating System—Software that runs on a computer to manage computer hardware and software, and provide a common set of services to applications.

Internet—A global system of interconnected networks connecting billions of devices around the world.

Intranet—A private network accessible only to the employees of an organization.

Jailbroken—A jailbroken device is one that has been deliberately compromised to remove software restrictions enforced by the manufacturer, allowing applications to be run that are not available to a non-jailbroken device.

Cloud—Also known as Cloud Computing or on-demand computing, is a model for enabling on-demand access to a shared pool of configurable computing resources, effectively enabling a data center within the internet.

Application Sandbox—A security feature of the Operating System, an Application Sandbox allows third party applications to run within a secure environment with a tightly controlled set of resources preventing them from influencing the Operating System or other applications running on the device.

Push Notification—A service offered by Operating System vendors to communicate to an application on a device, where that application typically runs within an application sandbox. A push notification token is used to identify the application and the device and is sent to the push notification service along with some notification content. When received by the device, the application which may be in a frozen state running in the background is awoken to handle the contents of the notification.

The increase in capability of portable devices, combined with the increase in availability of high speed internet has created an environment where employees now expect to be able to work from anywhere using a variety of devices. Those devices can be owned by the business, the employee or someone external. Therefore these devices are managed and maintained not exclusively by the own IT department but also by the employee itself or by the external user. These differently owned devices will have different statuses e.g. their security state (Anti-virus, Firewall etc.). All these devices will be used as connecting devices to connect to a corporate remote desktop or application hosted in the datacenter. To provide a compliant and secure corporate workspace, the IT department needs to consider the current status of the device connected to the corporate workspace.

Microsoft Remote Desktop Services is a widely used technology that allows users to access a remote desktop or application from either a session-based, or virtual desktop infrastructure-based server. In the following the term session is used for both session base or virtual desktop infrastructure based server. The server may be running on a data center within a corporate network, or from the internet. Users access the remote desktop or application using a Remote Desktop Client available on all mainstream devices including desktop platforms such as Windows and Mac OSX, and also mobile platforms such as Windows Phone, iOS, and Android. The Remote Desktop Client uses Remote Desktop Protocol (RDP) to deliver a high fidelity remoting experience, by transporting high quality graphics, audio, clipboard, storage and printers from the data center to the Remote Desktop Client. This ensures that as long as the user has connectivity to the data centre, they can access their desktop or application from any device, and wherever they are physically located.

Citrix XenApplication and XenDesktop is another widely adopted technology that aims to deliver both desktops and applications from the data center to the user. Citrix provides a Citrix Receiver product which delivers the remote desktop or applicate to a variety of devices, including desktop platforms such as Windows, Mac OSX, Linux and Chrome OS, and also mobile platforms such as Windows Phone, iOS, Android and Blackberry. Citrix Receiver uses the Citrix Independent Computing (ICA) remoting protocol to deliver high fidelity remoting experience to the user.

VMware Horizon is another adopted technology that aims to deliver both desktops and applications from the data center to the user. VMware provides a product which delivers the remote desktop or applicate to a variety of devices, including desktop platforms such as Windows, Mac OSX, Linux and Chrome OS, and also mobile platforms such as Windows Phone, iOS, Android and Blackberry. VMware uses the PCoIP remoting protocol to deliver high fidelity remoting experience to the user.

In addition there are a couple of other vendors offering solutions to provide a desktop or an application from the datacenter to the user. The majority of the businesses using Microsoft, Citrix or VMware.

Desktop as a Service (DaaS) is an emerging technology, where both applications and desktops are delivered from the cloud. This places additional pressure on IT to ensure that connected devices remain compliant with business policy.

Both Microsoft RDP and Citrix ICA offer Virtual Channels for some platforms allowing a developer to extend the remoting protocol with additional information. Microsoft RDP offer Virtual Channels for the Windows platform. Citrix ICA offer Virtual Channels for Windows, Linux and MAC OSX platforms.

Patent [ref: Application_15516JSMPTEP] uses Virtual Channels to communicate the state of the connected device to the remote desktop or application server. However, Virtual Channels are not available for all platforms. This invention provides a solution when Virtual Channels are not available.

There is an industry trend for applications to run in an application sandbox, with little or no capability to extend an application using plugins such as that required to extend the remoting client and/or the remoting protocol with Virtual Channels. These sandboxed applications are the only techniques available on platforms such as Apple's iOS and Google Android. Additionally, both Microsoft Windows and Apple's Mac OSX have introduced support for the newer sandboxed applications, with remote client applications available for both Microsoft Windows and Apple's Mac OSX which do not offer extensibility with Virtual Channel's. The lack of an extensible Virtual Channel prohibits a remote desktop or application server from establishing a direct network communication back to the connected device.

Mobile devices such as Apple's iOS and Google's Android also offer additional constraints to ensure consistent battery life. Without the possibility to extend the foreground application, a background application may provide the solution, however restrictions are imposed by the Operating System on background applications to minimize the impact on battery life. These sandboxed application platforms typically offer a push notification service, allowing a background application on a device to be awoken to handle the notification.

SUMMARY OF INVENTION

This invention provides a mechanism to read the state of a device, operating system and user session as it connects to a remote desktop or application, and deliver this state to the remote desktop or application by communicating with a device state server that will determine the state of the connecting device by a push notification to software running in the background on the connecting device. Further, the invention continues to monitor the state of the device, operating system and user session for as long as it is connected to the remote desktop or application, and in the event of a change of state, the updated state information is delivered to the remote desktop or application via the device state server.

Device State Server—An internet or intranet facing server that maintains a list of registered devices, including a push notification token, and in the event that a user login occurs on a remote desktop or application server from a registered device, sends a notification to awake the device state application running on that device. The device state server then facilitates the communication from the device state application, back to the remote desktop or application server.

Device State Application—An application that can be used to register with the device state server, and that typically remains running in the background, and is awoken by a push notification when required to send the state of the device, including device, OS and user session state back to the remote desktop or application server.

Device State Service—An application that runs on the Remote Desktop or Application Server and is loaded when the Operating System starts. The Device State Service identifies user sessions, monitors for the creation of new sessions, determines the state of the connected device by communicating with the Device State Server, persists the device state within the Windows Registry and Environment Variables, triggers Application Scripts and launches a Desktop Blocking Application to hide the Remote Desktop or Remote Application from the logged in user.

Desktop Blocking Application—An application that is launched by the Device State Service to hide the Remote Desktop or Remote Application from the logged in user, and to present a message to the user informing then why they are unable to access their Remote Desktop or Remote Application. By blocking access to the Remote Desktop or Remote Application rather than stalling it, the login process can continue ensuring that the time to login is not unnecessarily hindered.

A method is provided for controlling the access of a device to a remote desktop or a remote application running on a remote desktop or application server using a Device State Server, comprising the following steps:

Maintaining a central list of registered devices for each user or organization, by the user or organization installing and registering the Device State Application with the Device State Service, and storing information about the device, including but not limited to the device name and the push notification token required to wake the Device State Application.

Monitoring a Remote Desktop or Application Server for remote user sessions, and when detected, notifying the Device State Server of the remote connecting device, including but not limited to identifying information of the logged in user, and identifying information of the connecting device, such as the name of the device.

Upon being notified of a connected device, the Device State Server looking up a registered device using identifying information of the logged in user, and retrieving the push notification token for that device, and sending a push notification to the connected device.

Upon being awoken due to a push notification, the Device State Application monitoring the device to determine a device state and sending that device state back to the Device State Server.

Upon receiving device state from a Device State App, the Device State Server sending that device state to the Device State Service. This device state preferably sent by the Device State Service previously establishing a persistent communications channel to the Device State Server.

Determining by the remote desktop and application server based on the received device state if an access to the remote desktop or remote application running in the user session is allowed (or the if the user session can be set up), and block the access if the access is due to the received state not allowed. The access can be blocked by an application which is activated in the user session and which hides the remote desktop or remote application from the user.

In a further embodiment the device state comprises one or more of the following information of the device:

network information such as IP, MAC, Gateway addresses, Wi-Fi Access Point. Blacklists or White lists can be used by the Device State Service to decide about the access.

network security information such as Wi-Fi Encryption and Authentication Protocols. If no or only limited security information are used or are available the access can be denied.

network performance information, such as Bandwidth and Latency. If the parameters are below a certain threshold the access can be denied.

metadata about the running Operating System, such as the name, version, service pack level. If the operation system and the service pack level do not provide a sufficient security the access is blocked or limited.

installed applications. If certain applications are installed which allow capturing of information, an access is blocked license state of installed applications or the operating system. Also the license state can be used to determine the access, for example only validly licensed products are allowed.

running applications on the device. Illegal software can be determined and an access be blocked.

geographical location or elevation; also the location can be used to determine an illegal access. For example certain geographical regions can be excluded. Also places where information are not securely transmitted.

information if the device is jailbroken or hacked in some way that compromises the security of the device. This is used to make sure the transferred data is safe.

information about operating system updates, which have been applied to the device;

is an Anti-Virus installed and up to date;

security information of the logged in user, including their privileges, security group membership, domain membership.

All these aspects are taken alone or in combination to control the access and to decide the level of access or if a blocking is performed.

In a possible approach the information of the device state can be combined by operators to represent a Composite Connected Device State that allows one or more of the device states to be combined into one or more composite device states by the use of logical operations, by area specifications or by conditional information. The composite device state is not different from any other device state once it has been computed, and can be used to grant or deny access to the desktop, and can be used by administrative scripts just like other device states.

The advantage to the customer is that the composite device state can better represent business policy of any user.

In a possible embodiment the received device state or composite connected device state is made available to other applications, by using one or more of the following steps:

the device state is made available within the Windows Registry;

the device state is made available within Environment Variables;

the Connected Device State is made available through an Application Programming Interface (API);

the Connected Device State is made available through an Application.

All these approaches allow an access of third party applications onto the device state, which can also decide to limit the access.

All these information are preferably provided by the Device State Application after being activated by a push notification in response to the Device State Service notifying the Device State Server of a new remote connection.

The device state service that is installed on the remote desktop or application server, is preferably a system service, launching when the remote desktop or application server starts up and having preferably privileged access to an operating system, being capable of communicating with a Device State Server to notify it of the connected device, and receiving the state of the connected device through preferably a persistent network connection to the Device State Server, receiving updates of changes of the device state and controlling the access control.

In a possible embodiment the device state service launches a desktop blocking application preventing the user from viewing the Remote Desktop or Remote Application if one or more of the following conditions are fulfilled:
- the device state of the device is unavailable;
- insufficient to access rights for the Remote Desktop or Remote Application;
- the device is a connecting device;
- the device is not connected to a session;
- the device state is not accepted by device state service.

In a further embodiment the Device State Service persist the device state as properties within a Windows Registry or as Environment Variables for the session, which allows other applications also to use it.

In an alternative embodiment the device state service launches administrative scripts or applications when the device is connecting or connected to the remote desktop or application server, when reconnecting to an existing Session and/or upon changes to the state of the Connected Device. This allows a quick reaction on changes of the device state, which can occur for example when the device is moving to other places. Another example, could be when the user starts uninstalling their Anti-Virus, or disabling their Firewall.

In another embodiment, when the Device State Service is notified of a new Session or of a reconnect to an existing Session, then the device state service immediately launches the desktop blocking application to prevent a user from being able to view any running applications or files until the device state of the connected Device is known and sufficient for the user to access the Remote Desktop or Remote Application.

In another embodiment, the Device State Service changes the access token of the user logging onto the remote user session depending upon the state of the connected device. The access token is used by the Operating System to grant or deny access to applications, files and folders, the Windows Registry, and all other securable resources. The Device State Service adds or removes security groups, privileges or user claims from the access token depending upon the state of the connected device, thus controlling the resources accessible to the logged in user.

One example of where the invention will benefit corporate compliance, is where employees must access a sensitive Remote Application from one or more specific locations. This sensitive Remote Application may display corporate financial information, customer confidential information, or any other sensitive information. The specific locations that employees can access this sensitive Remote Application may be limited to the company offices. They may also be permitted to access the sensitive Remote Application from the home office. The IT department may choose to grant access to the Remote Application if the Connecting Device is geographically located within a specific range of each of the offices geographical coordinates. Alternatively, the IT department may choose to grant access to the sensitive Remote Application if the Connecting Device is using the corporate Wi-Fi, which may include a check on the Wi-Fi SSID, the Wi-Fi BSSID, and the address of the primary DNS server. To grant access to the home office for select users, the IT department may also configure the invention to also allow access to the sensitive Remote Application if the Connected Device is joined to one or more approved home Wi-Fi SSID, but with an additional check that the home Wi-Fi is authenticated and encrypted.

Another example of where the invention will benefit corporate compliance, is where employees are permitted to access the corporate Remote Desktop from their personal devices, with the constraint that the device must implements good security best practices. The IT department typically has little control over these employee owned corporate devices, which is a risk to the company if good security practices are not followed. For example, the IT department could choose to only grant access to the corporate Remote Desktop from a Microsoft Windows Connected Device if that device is up to date with the latest Windows Updates, has an up to date Anti-Virus, has the firewall enabled and the logged in user does not have local administrative privileges.

An extension to the above example, is where a company wants to permit access to their Remote Desktop or Remote Application environment for consultants. The IT department typically has little control over the consultant's devices, yet they are more productive using their own, familiar devices. The invention allows the IT department to enforce that the consultant is implementing good security practices.

Another example of where the invention will benefit a company is with device based licensing. Some software products are sold with a device based licensing model, permitting any user to access the software as long as they are doing so on a licensed device. The IT department could configure the invention with a list of devices that are permitted to access the software, and by comparing the Connected Device name with the contents of the list, could choose to permit access to the software.

Another example of where the invention will benefit a company is with printer mapping. Many employees expect easy access to their most local printer. In some cases, employees may be required to access a specific printer, for example in the case of a member of the financial department who must print financial documents to the finance printer to ensure they are kept private from other employees. With this invention, the IT department could define a composite connected device state named 'Printer'. If the user of the connected device is a member of the Finance security group then it could be set to the value 'Finance_Printer'. Otherwise if the employee was geographically located in OfficeA and with a geographical elevation of 20 meters, then the composite connected device state could be set to 'OfficeA_Floor3_Printer'. An administrative script could then be used to invoke an Operating System command that automatically maps the printer to the value of the composite connected device state.

DETAILED DESCRIPTION

Figure 1:
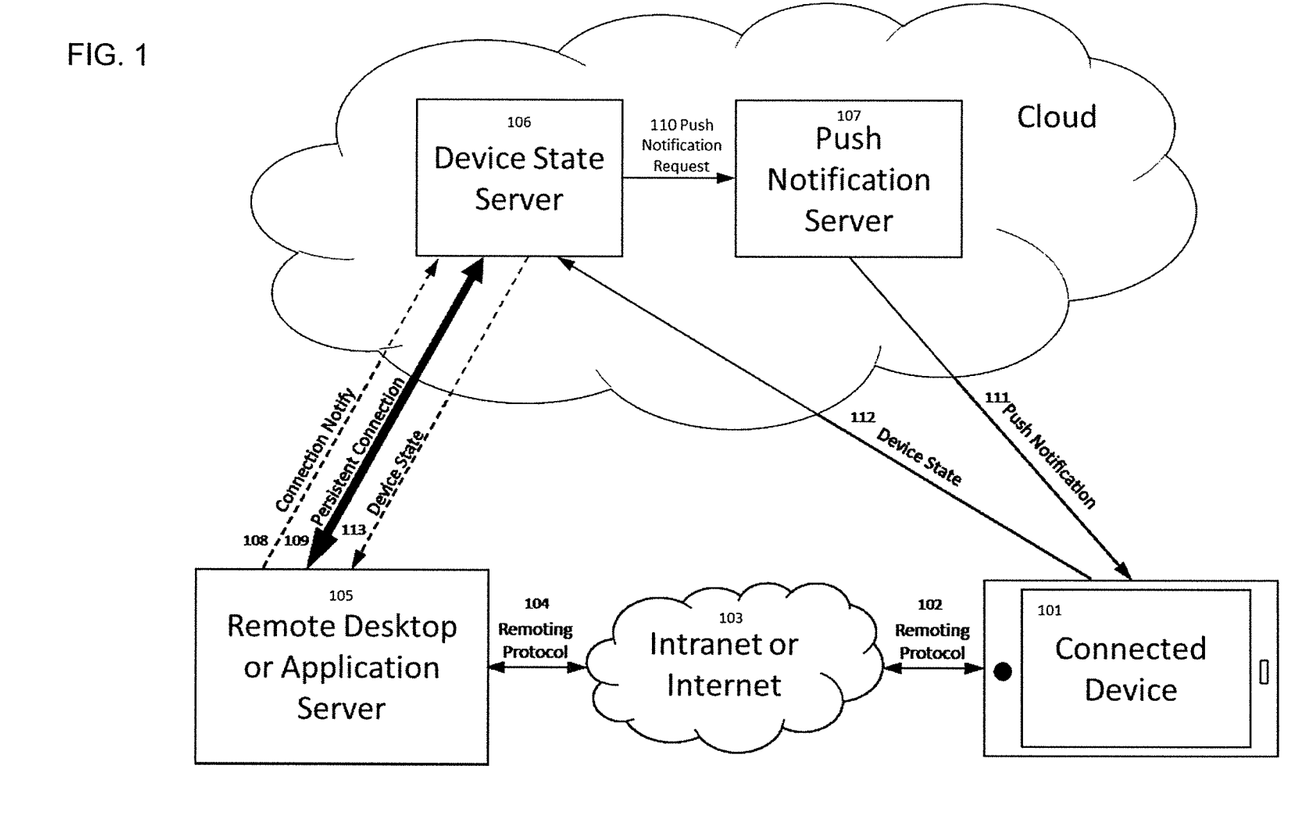
FIG. 1 shows Device connecting to a Remote Desktop or Application Server.

FIG. 1 shows a device 101 connected to a Remote Desktop or Application Server 106. The device connection is provided using a Remoting Protocol 102, 104, which may communicate over the local intranet or the internet 103 or both, before connecting to the Remote Desktop or Application Server 106. Since the Remoting Protocol 102, 104 cannot be extended by a Virtual Channel plugin on the Connected Device 101, communication is established using the Device State Server 106 and the Push Notification Server 107. When the Remote Desktop or Application Server detects a new remote connection, it notifies 108 the Device State Server 106 of the connection, which in turn sends a Push Notification Request 110 to the Push Notification Server 107 which awakes via a push notification 111 software running on the Connected Device 101. The Connected Device 101 then reads the device state and sends it 112 to the Device State Server 106, which forwards the device state 113 back to the Remote Desktop or Application Server using a Persistent Connection 109.

Figure 2:
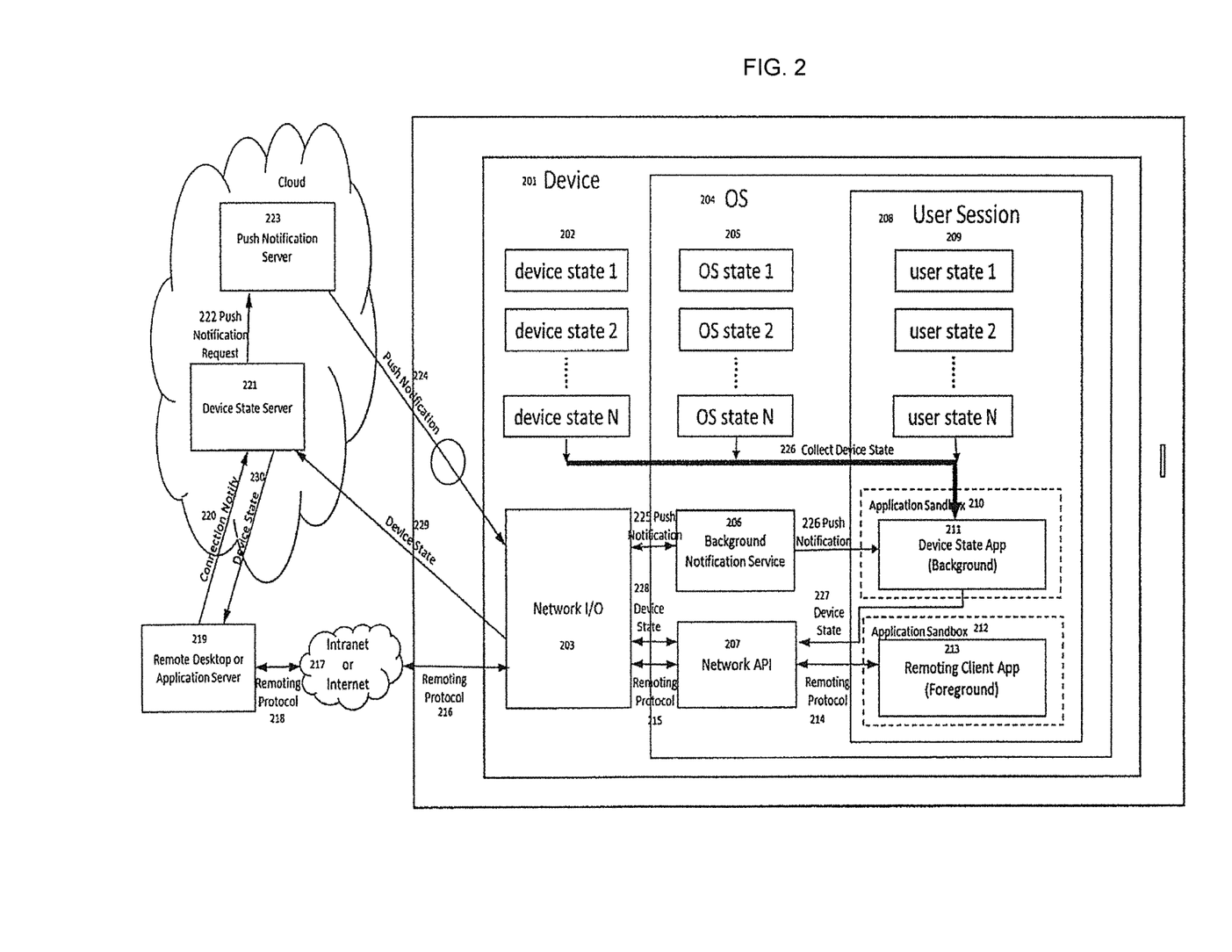
FIG. 2 shows a layer structure of a Connected Device after establishing the connection with a Remote Desktop or Application Server.

FIG. 2 shows the collection of state from a Connected Device 201. The Connected Device 201 state comprises of one or more states of the physical device 202 or components of that device, such as the speed of the processor or the amount of physical memory, and also a network i/o module capable of communicating with the internet or intranet. The Connected Device 201 also contains an Operating System 204 which comprises of one or more states 205, such as the version number, or the installed software. The Operating System also contains a Background Notification Service 206 responsible for efficiently retrieving push notifications for applications running on the device, and a Network API 207 to allow the Operating System or running applications to communicate with the internet or intranet. The Connected Device 201 also contains a logged in User Session 208 which comprises of one or more states of the user 209 such as the running applications. A Device State Application 211 is running in the background within its Application Sandbox 210, whilst in the foreground, the Remoting Client Application 213 is also running within its own Application Sandbox 212. The Device State Application 211 has been previously registered with the Device State Server 221.

When the Remoting Client 213 establishes a connection with the Remote Desktop or Application Server 219 using the Remoting Protocol 214, 215, 216, 218 which may have communicated over the intranet or internet 217, the Device State Server 221 is notified of the new connection 220, which in turn results in a Push Notification Request 222 to the Push Notification Server 223. The Push Notification Server 223 sends a Push Notification 224, 225, 226 via the Background Notification Service 206 to the Device State Application 211. The Device State Application 211 then collects the Device State 226 from the physical device state 202, the Operating System state 205 and the User Session state 209 and sends the resulting Device State 227, 228, 229 to the Device State Server 221, which forwards the Device State 230 to the Remote Desktop or Application Server 219.

Figure 3:
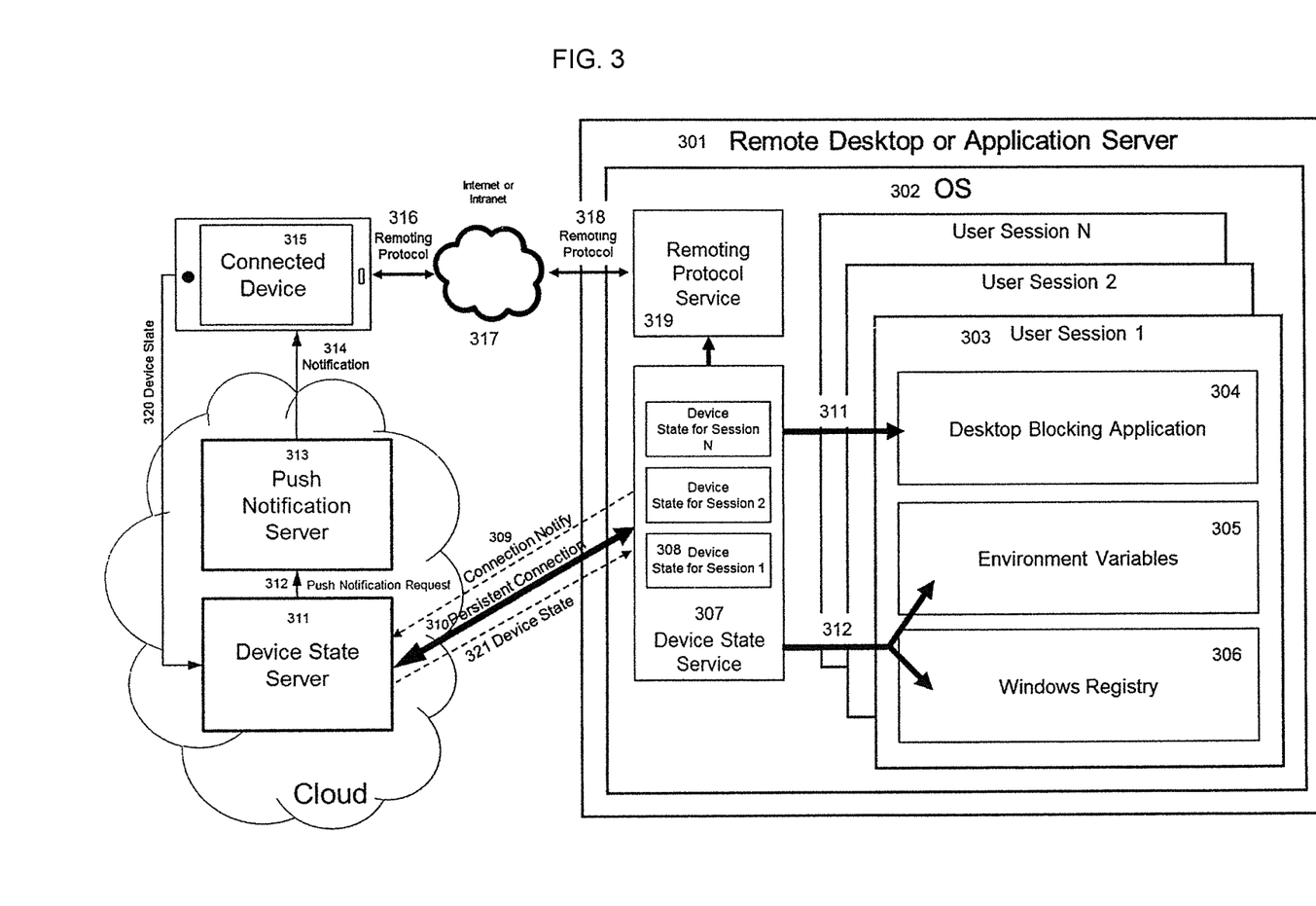
FIG. 3 shows a layer structure of a Remote Desktop or Application Server.

FIG. 3 shows the Device State Service 307 which is installed on the Remote Desktop or Application Server 301. This service is a system service, if therefore launches when the Remote Desktop or Application Server 301 starts up and has privileged access to the Operating System 302. The Connected Device 315 has established a connection with the Remoting Protocol Service 319 using the Remoting Protocol 316, 318, which is associated with a User Session 303. The Remoting Client running on the Connected Device 315 does not offer any extensibility to communicate over a Virtual Channel, so the Device State Service 307 must communicate with the Connected Device 314 using the Device State Server 311.

The Device State Service 307 is able to enumerate existing User Sessions 303 and also monitor the creation of new User Sessions 303 using Operating System 302 functionality. The Device State Service 307 is also able to detect if a User Session 303 is a remote session. This is accomplished by a function call to the Remote Protocol Services 319. This call can be different for different implementations of the Remoting Protocol Service 319. For Microsoft's Remote Desktop Protocol RDP, this can be a call to WTSQuerySessionInformation supplying WTS_INFO_CLASS of WTSClientProtocolType. For Citrix's Independent Computing Architecture (ICA), this can be a call to WFGetActiveProtocol.

The Device State Service 307 communicates with the Connected Device 315 by notifying the Device State Server 311 of the connection 309. It should be noted that neither the Device State Server 311 or the Connected Device 315 may be able to communicate directly with the Remote Desktop or Application Server, which if located in an intranet 317 will likely be protected by a firewall, preventing either component from establishing a connection with the Device State Service 307 and communicating the Device State. A Persistent Connection 310 is therefore established by the Device State Service 307 to the Device State Server 311 to overcome this. After being notified of the connection 309, the Device State Server 311 sends a Push Notification Request to the Push Notification Server 313 which wakes the Device State Application on the Connected Device 315 and results in the Device State 320 being sent back to the Device State Server 311. The Persistent Connection 310 previously opened by the Device State Service 307 is then used to send the Device State 321 back to the Device State Service 307.

The Device State Service 307 is able to launch a Desktop Blocking Application 304 which can prevent the user from viewing the Remote Desktop or Remote Application if the state of the Connecting Device 315 is unavailable, or insufficient to access the Remote Desktop or Remote Application. It is also possible that certain applications cannot be started or an access to the desktop is rejected. Also the access rights to information, files, databases, applications etc. can be changed.

The connecting device becomes a connected device if the access is granted by Device State Service 307.

The Device State Service 307 is able to persist the state of the Connected Device 315 as properties within the Windows Registry 306 or as Environment Variables 305 for the appropriate User Session 303. It could also offer an Application Programming Interface (API) providing access to the state of the Connected Device 315, it could provide an executable that returns the state, or it could persist them to a file to be read by software running on the Remote Desktop or Application Server.

The Device State Service 307 can also alter the access token when a user logs onto the remote desktop or remote application. This may involve adding or removing a security group, privilege or user claim from the access token, according the state of either the connected device, or the composite device state. This results in the control of the logged in user to access the files, registry, databases, applications etc that the user can interact with.

The Device State Service 307 can launch Administrative Scripts or Third Party Applications when the user logs into the Remote Desktop or Application Server 318, when they reconnect to an existing User Session 303 or upon changes to the state of the Connected Device 318. The scripts could map the printer based on the location of the connected device.

The scripts could map a network drive based upon the state of the connecting device. The scripts could change the behaviour of the OS, to ensure that they can just click on files (instead of double clicking) if the device is a touch device (as opposed to a keyboard and mouse). The scripts could call to OS functionality to allow or deny the user to view a file, such as a financial document.

The scripts could choose to offer an application to the user depending upon whether the connected device has a license for that application. The scripts could reconfigure video playback software to present in a higher or lower quality depending upon the performance of the network between the connecting device and the remote desktop server, and depending upon the capabilities of the connecting device to render the video smoothly.

The persistence of the state of the Connected Device 318, combined with the ability to launch Administrative Scripts or Third Party Applications, allows Third Party Software, or Administrative Scripts to act on the state of the Connected Device 318 in accordance with the IT Administrators corporate policy, or to enhance the experience of the user by altering the Remote Desktop or Remote Application in a way that makes it more consumable to the Connected Device 318.

Figure 4:
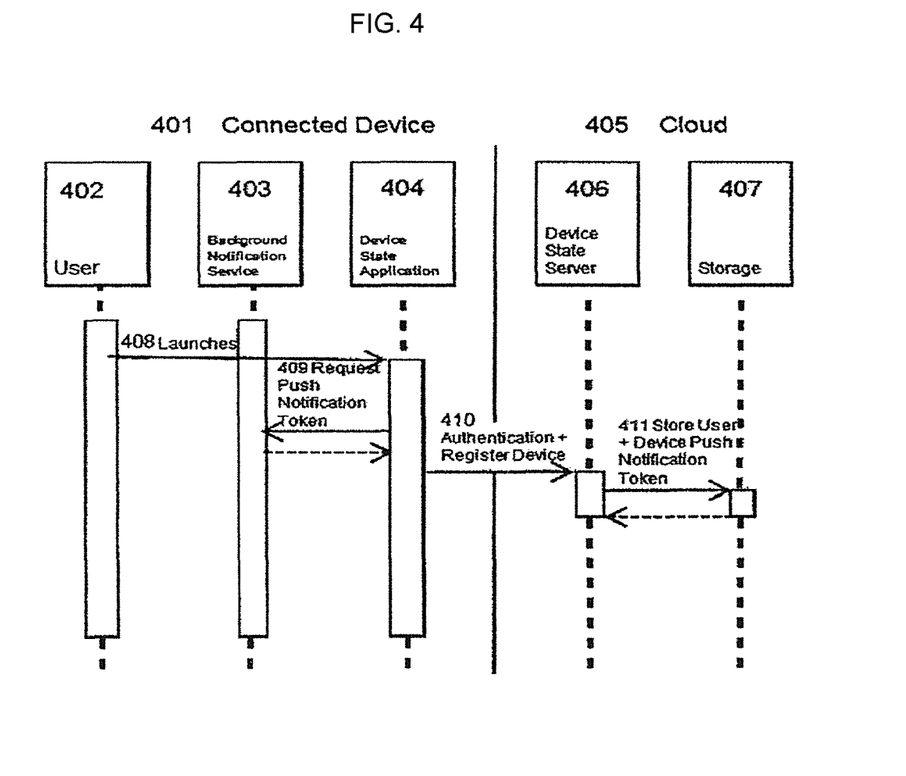
FIG. 4 shows the sequence involved in registering the Device State Application with the Device State Server.

FIG. 4 shows the Connected Device 401 registering with the Device State Server 406 running potentially within the Cloud 405. After installing the Device State Application 404, the User 402 launches 408 the Device State Application 404 which calls to the Background Notification Services 403 to request a Push Notification Token 409. The Device State Application 404 prompts the User 402 to authenticate with the Device State Server 406 and the user information, device information and Push Notification Token are registered 410 with the Device State Server 406 which stores this information 411 within the Storage 407.

Figure 5:
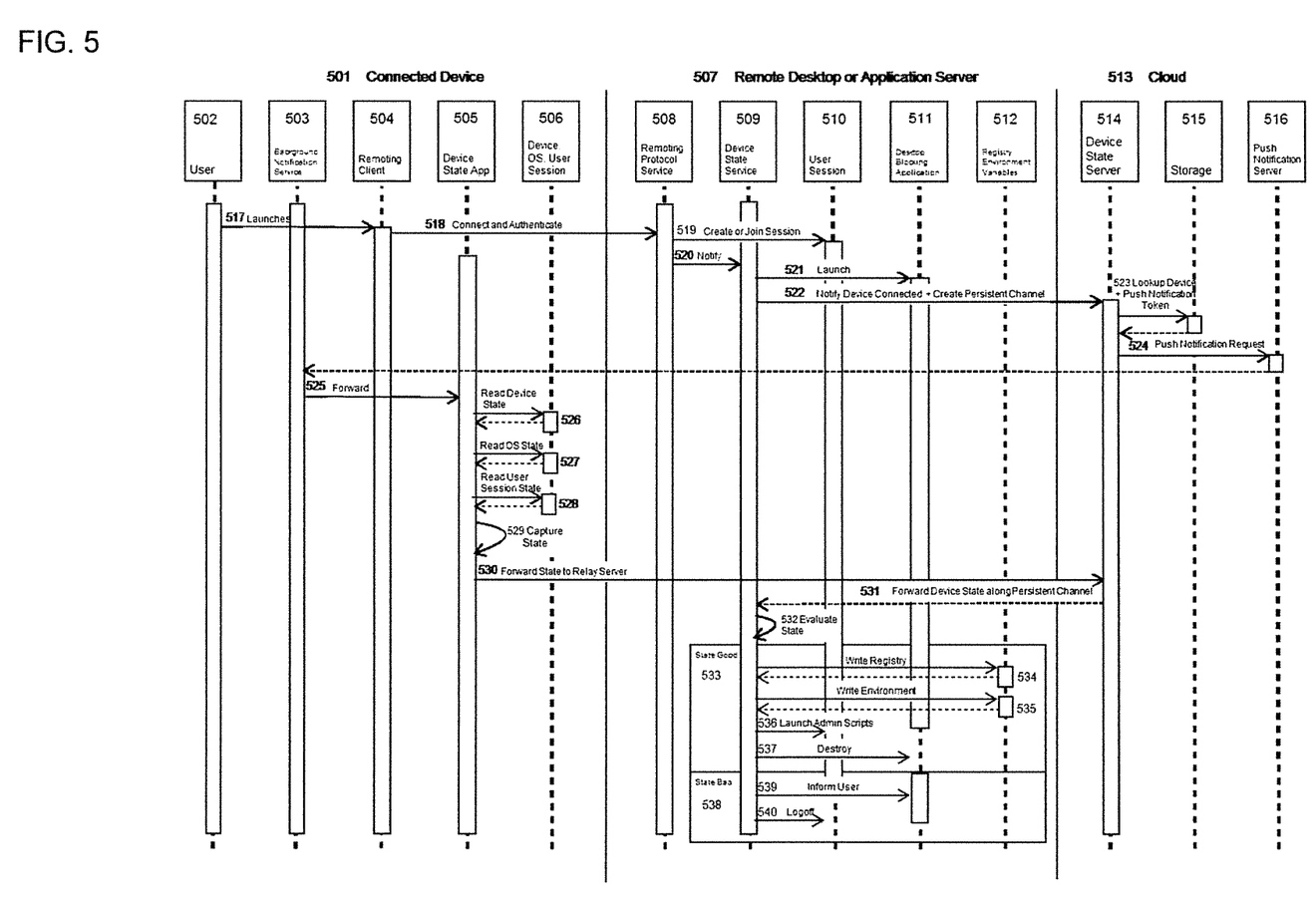
FIG. 5 shows the sequence involved in establishing a connection between a Device and a Remote Desktop or Application Server.

FIG. 5 shows the sequence of establishing a connection between the Connected Device 501 and the Remote Desktop or Application Server 507. The Connected Device 501 consists of the User 502 wishing to establish the connection using the Remoting Client 504. The Background Notification Service 503 is an Operating System feature that will notify the Device State Application 505 when it needs to wake up and can read the state of the Device, OS and User Session 506. The Remote Desktop or Application Server 507 includes the Remoting Protocol Service 508 that implements the server side or the Remoting Protocol, the Device State Service 509, the logged in User Session 510, which may already exist, the Desktop Blocking Application 511 and the Registry and Environment Variables 512.

The sequence starts when the User 502 chooses to launch 517 the Remoting Client 504. The Remoting Client 504 connects and authenticates 518 the User 502 by communicating with the Remoting Protocol Service 508 over the Intranet or Internet using the Remoting Protocol.

If the Remoting Protocol Service 508 successfully authenticates the User 502, then it chooses to either create a new session or to join an existing session 519. Either the Remoting Protocol Service 508 or functionality of the Operating System will then notify 520 the Device State Service 509 of the new User Session 510 or the reconnect to an existing User Session 510.

When the Device State Service 509 is notified of a new User Session 510 or of a reconnect to an existing User Session 510, then the Device State Service 509 immediately launches the Desktop Blocking Application 521 to prevent the User 502 from being able to view the desktop, any running applications or files until the state of the Connected Device 501 is known and sufficient for the User 502 to access the Remote Desktop or Remote Application.

The Device State Service 509 then notifies the Device State Server of the new connection 522 and establishes a Persistent Channel allowing the Device State Server to communicate back to the Device State Service 509 potentially through a firewall on the intranet upon which the Remote Desktop or Application Server resides. The Device State Server then looks up the device 523, including the Push Notification Token from the Storage 515, which will have previously been stored as a result of the Device State App's registration with the Device State Server, see FIG. 4. The Device State Server then sends a Push Notification Request 524 to the Push Notification Server 516 which then wakes the Device State Application 505 by a call to the Background Notification Service 503, which forwards the push notification 525 to the Device State Application 505.

Upon receiving a request for state of the Connecting Device 501, the Device State Application 505 reads the state of the device 526, the OS state 527 and the user session state 528. This state is captured 529 and stored locally to be used to detect changes to the state. The state information is then forwarded to the Device State Server 514, which at this point is helping to maintain the Persistent Channel previously established 522. The Device State is then forwarded 531 to the Device State Service 509 along the Persistent Channel.

Upon receiving the Device State, the Device State Service 509 then evaluates the state 532 of the Connecting Device 501 according to a configuration. If the state of the Connecting Device 501 is good 533, then the state is written to the Windows Registry 534 and as Environment Variables 535 for the User Session 510. Any Administrative Scripts or Third Party Applications are then launched 536 allowing the Remote Desktop or Remote Application to be customized. Finally the Desktop Blocking Application 511 is closed allowing the User 502 to access their applications and data.

If the Device State Service 509 after evaluating the state 532 of the Connecting Device 501 determines that the state is bad 538, then the Device State Service 509 calls to the Desktop Blocking Application 511 to inform the user 539 that the Connecting Device is unable to access the Remote Desktop or Remote Application. Finally, the User Session 510 is logged off 540. In an alternative embodiment only a restricted access is provided to resource based on the precise state. For example the text processing application can be started, and documents can be stored locally on the desktop but an access to emails or management system like SAP are not allowed.

Figure 6:
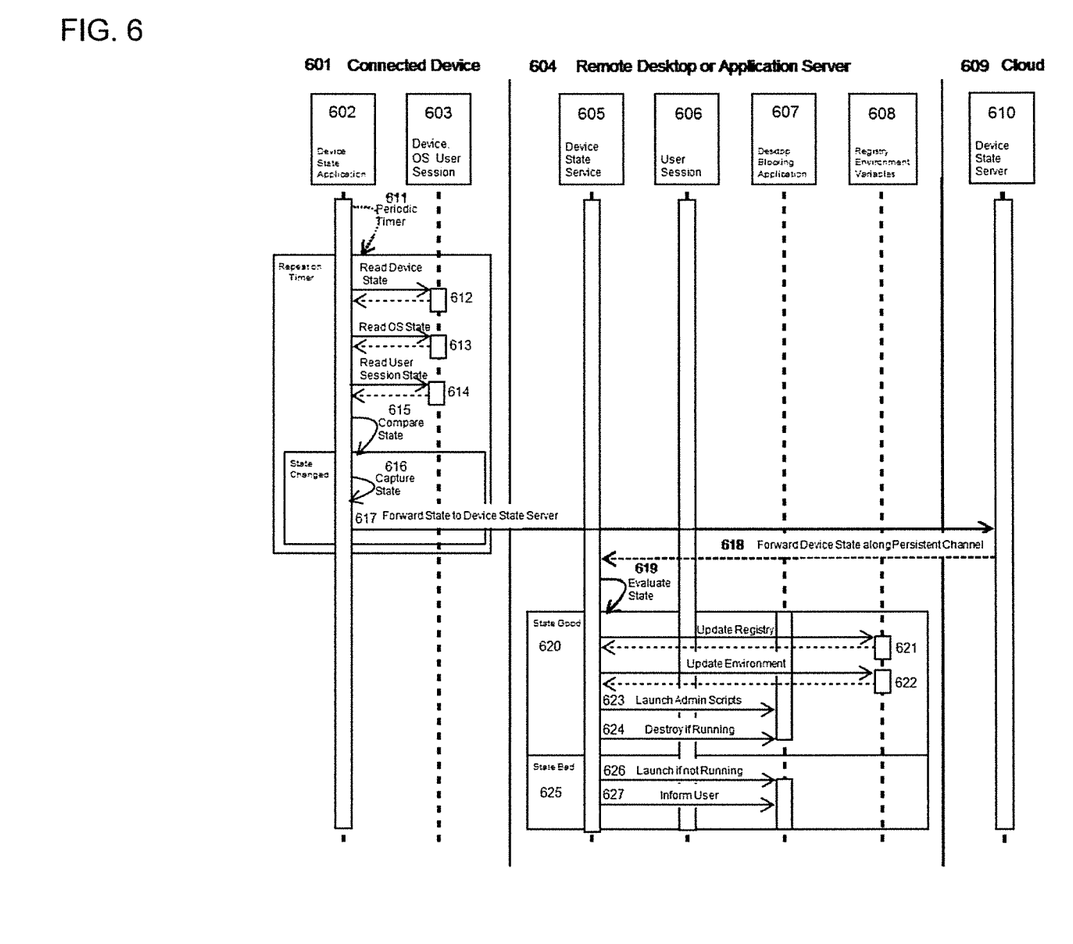
FIG. 6 show the Monitoring for changes to the Connected Device state.

FIG. 6 shows the sequence of monitoring the state of the Connected Device 601 and updating the Remote Desktop or Application Server 604 with those changes. The Connected Device 601 consists of the Remoting Client 602 which has previously connected to the Remote Desktop or Application Server 604 as described in FIG. 5, and includes the creation of a Persistent Channel between the Device State Service 605 and the Device State Server 610. The Device State Service 605 allows a central management of the rules which relate to the sessions and the states and the user. The User Session 606 was created when the user first logged in, and may or may not be showing the Desktop Blocking Application 607 depending upon the state of the Connected Device 601. The Device State Service 605 will have written the state of the Connected Device 601 into the Registry or Environment Variables 608.

The sequence extends FIG. 5 by a periodic timer 611 which on some arbitrary time-out will read the state of the device 612, the OS state 613 and the user session state 614. This state information is compared to the previous state of the device which may have been captured in FIG. 5, 529, or FIG. 6, 616, whichever is most recent. The new captured state is retained for next time the periodic timer 611 expires. If it is determined that the state of the device has changed, then the new state is forwarded 617 to the Device State Server 610 which forwards the Device State along the Persistent Channel 618. The timer can also be replaced by an interrupt service that is triggered upon hardware events.

Instead of a periodic timer 611, the Device State Application may register with the Operating System of the Connected Device 601 to receive a notification when one or more of the state of the Connected Device 601 changes. This may even include the Device State Application 602 being awoken whilst running in the background as a result in a change of the geographical location of the device. In this circumstance, the Device State Application 602 would not wait for the timer before continuing the process of reading the state of the device 612, the OS state 613 and the use session state 614 before capturing the state 616 and forwarding the new device state to the Device State Server 617.

The Device State Service 605 then evaluates the new state 619 of the Connected Device 601 according to a configuration. If the state of the Connecting Device 601 is good 620, then the new device state is written to the Windows Registry 621 and to the Environment Variables 622 for the logged in user. Any Administrative Scripts or Third Party Applications are then launched 623. Finally, if the Desktop Blocking Application 607 is currently being shown it is destroyed or hidden 624.

If the Device State Service 605 after evaluating the updated state of the Connected Device 601 determines that the state is bad 625, then if the Desktop Blocking Application 607 is not currently running it is launched 626 and finally the Device State Service 605 calls the Desktop Blocking Application 607 to present a suitable message informing the user 627 why they cannot access their Remote Desktop or Remote Application.

The Desktop Blocking Application is part of the invention. It is launched within a (remote) user session and it creates a topmost window that is drawn above all other windows to hide their desktop, their applications and their files. This window presents a message such as 'Connecting to DEVICENAME . . . ' whilst the device state is determined, and either disappears if the device state is acceptable, or displays a message explaining why the device state is unacceptable for them to access their desktop.

Figure 7:
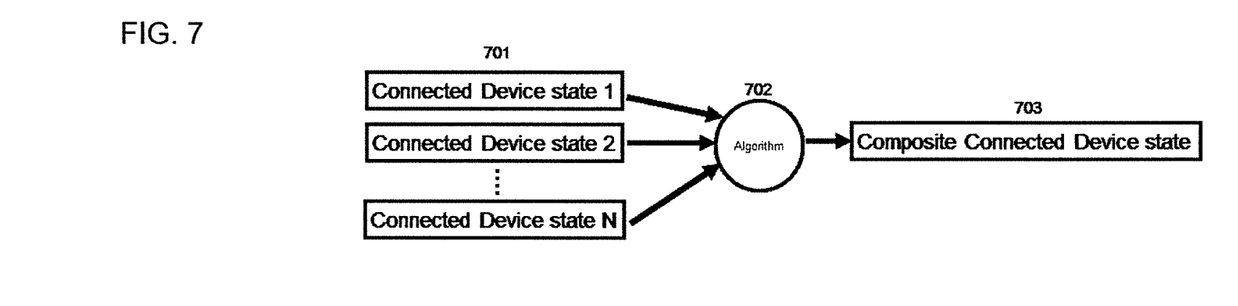
FIG. 7 Combining state of connecting device into a new composite state.

FIG. 7 extends the invention with the mapping of the state of the Connected Device 701 into a new Composite Connected Device state 703 using some algorithm 702. The Connected Device state 701 may be any of the states collected from the Connected Device, such as the physical device state, the OS state or the user session state. An algorithm 702 combines the states into a composite Connected Device state 703. The algorithm may be defined by the Device State Service, or may be defined by a configuration supplied by the IT department. The algorithm can for example combine multiple operations on Connected Device state 701 with Boolean logic. The operations on the Connected Device state may include operators such as equality, inequality, greater than, greater than or equals, less than, less than or equals, contains, does not contain, starts with, ends with or pattern matching. The operations on the Connected Device state may also include distance from geographical locations. An example composite Connected Device state may be a 'Connected Device Performance' state, which if the physical device's CPU speed is greater than some value, and the physical devices memory is greater than some value, and the network speed is greater than some value, then the 'Connected Device Performance' state would be 'High', else 'Low'.

Accordingly, complex logic can be used to determine the rights of a connected device The above description has not the intention to limit the scope of protection. They are only examples to explain the general principles of the invention.

What is claimed is:

1. A method for controlling the access of a device to a remote desktop or a remote application running on a remote desktop or application server using a remoting protocol, comprising the following steps:

Registration of the device with a device state server to store device identifying information, including a push notification token;

Using the device state server to wake a device state application on the device in response to the detection of a connectivity between the device and the remote desktop or application server;

Monitoring the device to determine a device state;

Sending the device state from the device to the device state server which in turn forwards the device state to the remote desktop or application server;

Determining based on the received device state if an access to the remote desktop or remote application running in the user session is allowed, and block the access if the access is due to the received state not allowed, wherein the remoting protocol is used to capture graphics, audio, clipboard or storage from a remote session and deliver the graphics, audio, clipboard or storage to the device where the graphics, audio, clipboard or storage can be reconstructed to give the illusion that the remote desktop or remote application is running on the device.

2. The method according to claim 1, wherein the device state comprises one or more of the following information of the device:

network information including at least one of IP, MAC, Gateway addresses, and WiFi Access Point;

network security information including at least one of WiFi Encryption and Authentication Protocols;

network performance information including as least one of Bandwidth and Latency;

metadata about the running Operating System include at least one of the name, version, and service pack level;

installed applications;

license state of installed applications or the operating system;

running applications on the device;

geographical location or elevation;

information if the device is jailbroken or hacked in some way that compromises the security of the device;

information about operating system updates, which have been applied to the device;

is an Anti-Virus installed and up to date;

security information of the logged in user, including their privileges, security group membership, domain membership.

3. The method according to claim 2, wherein the information of the device state can be combined by operators to represent a Composite Connected Device State, which allows a fine granular access to resources of the remote desktop or remote applications by the device.

4. The method according to claim 1, wherein the received device state or composite connected device state is made available to other applications, by using one or more of the following steps:

the device state is made available within the operating system Registry;

the device state is made available within Environment Variables;

the Connected Device State is made available through an Application Programming Interface (API);

the Connected Device State is made available through an Application.

5. The method according to claim 1, wherein security information are added or removed from the access token of the user logged into the remote session based on the received device state or composite connected device state.

6. The method according to claim 1, comprising a device state application running on the device which is automatically activated when setting up a session, by a push notification from the device state server, and sending the device state back to the device state server which forwards the device state to the remote desktop or application server.

7. The method according to claim 1, comprising a device state service which is installed on the remote desktop or application server, being preferably a system service, launching when the remote desktop or application server starts up and having preferably privileged access to an operating system, being capable of notifying a device state server with access to the connecting devices push notification token, communicating with the device preferably by a push notification, receiving the device state preferably by a persistent communications channel to the device state service, receiving updates of changes of the device state and controlling the access control.

8. The method according to claim 7 wherein the device state service launches a desktop blocking application preventing the user from viewing the Remote Desktop or Remote Application if one or more of the following conditions are fulfilled:

the device state of the device is unavailable;

insufficient to access rights for the Remote Desktop or Remote Application;

the device is a connecting device;

the device is not connected to a session;

the device state is not accepted by device state service.

9. The method according to claim 7 wherein the Device State Service persist the device state as properties within an operating system Registry or as Environment Variables for the session and/or wherein the device state service launches administrative scripts or applications when the device is connecting or connected to the remote desktop or application server, when reconnecting to an existing Session and/or or upon changes to the state of the Connected Device.

10. The method according to claim 7 wherein when the Device State Service is notified of a new Session or of a reconnect to an existing Session, then the device state service launches the desktop blocking application which prevents a user from being able to view any running applications or files until the device state of the connected Device is known and sufficient for the user to access the Remote Desktop or Remote Application.

11. A system for controlling the access of a device to a remote desktop or a remote application running on a remote desktop or application server using a remoting protocol, comprising:

a device with a network interface, configured to set up a connection between the device and remote desktop or application server to establish or to an existing user session, using the remoting protocol;

the device and the remote desktop or application server are configured to communicate by waking an application on the device in response to an established remoting protocol connection, and routing the communication through an intermediate server back to the remote desktop or application server;

the device is configured to monitor and to determine a device state;

the device is configured to send the device state over the intermediate server to the remote desktop or application server;

the remote desktop or application server is configured to determine based on the received device state, if an access to the remote desktop or remote application running in the user session is allowed, and is configured to block the access if the access is due to the received state not allowed, wherein the remoting protocol is used to capture graphics, audio, clipboard or storage from a remote session and deliver the graphics, audio, clipboard or storage to the device where the graphics, audio, clipboard or storage can be reconstructed to give the illusion that the remote desktop or remote application is running on the device.

12. The system according to claim 11, wherein the device state comprises one or more of the following information of the device:

network information including at least one IP, MAC, Gateway addresses, and Wi-Fi Access Point;

network security information including at least one of Wi-Fi Encryption and Authentication Protocols;

network performance information including at least one of Bandwidth and Latency;

metadata about the running Operating System including at least one of the name, version, service pack level;

installed applications;

license state of installed applications or the operating system;

running applications on the device;

geographical location or elevation;

information if the device is jailbroken or hacked in some way that compromises the security of the device;

information about operating system updates, which have been applied to the device;

is an Anti-Virus installed and up to date;

security information of the logged in user, including their privileges, security group membership, domain membership.

13. The system according to claim 12, wherein the information of the device state is combined by operators to represent a Composite Connected Device State, allowing a fine granular access to resources of the remote desktop or remote applications by the device.

14. The system according to claim 11, wherein the received device state or composite connected vice state is made available to other applications, by using one or more of the following steps:
the device state is made available within the operating system Registry;
the device state is made available within Environment Variables;
the Connected Device State is made available through an Application Programming Interface (API);
the Connected Device State is made available through an Application.

15. The system according to claim 11, wherein the security information are added or removed from an access token of the user logged into the remote session based on the received device state or composite connected device state.

16. The system according to claim 11, comprising a device state application running on the device to be automatically activated when setting up a session, by a push notification from a device state server, and sending the device state back to the device state server which forwards the device state to the remote desktop or application server.

17. The system according to claim 11, comprising a device state service being installed on the remote desktop or application server, being preferably a system service, configured to be launched when the remote desktop or application server starts up and having preferably privileged access to an operating system, being capable of notifying a device state server with access to the connecting devices push notification token, communicating with the device preferably by a push notification, receiving the device state preferably by a persistent communications channel to the device state service, receiving updates of changes of the device state and controlling the access control.

18. The system according to claim 17, wherein the device state service is configured to launch a desktop blocking application preventing the user from viewing the Remote Desktop or Remote Application if one or more of the following conditions are fulfilled:
the device state of the device is unavailable;
insufficient to access rights for the Remote Desktop or Remote Application;
the device is a connecting device;
the device is not connected to a session;
the device state is not accepted by device state service.

19. The system according to claim 17 wherein the Device State Service is configured to
persist the device state as properties within an operating system Registry or as Environment Variables for the session and/or;
launch administrative scripts or applications when the device is connecting or connected to the remote desktop or application server, when reconnecting to an existing Session and/or upon changes to the state of the Connected Device.

20. The system according to claim 17, wherein when the Device State Service is notified of a new Session or of a reconnect to an existing Session, then the device state service is configured to launch the desktop blocking application which prevents a user from being able to view any running applications or files until the device state of the connected Device is known and sufficient for the user to access the Remote Desktop or Remote Application.

* * * * *